(12) United States Patent
Hanam et al.

(10) Patent No.: US 7,461,319 B2
(45) Date of Patent: Dec. 2, 2008

(54) SYSTEM AND METHOD FOR DOWNLOADING FILES OVER A NETWORK WITH REAL TIME VERIFICATION

(75) Inventors: Gerald J. Hanam, Framingham, MA (US); Kurt R. Ross, Westford, MA (US); John D. Morrison, Westborough, MA (US); Gary A. Zellerbach, San Francisco, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 967 days.

(21) Appl. No.: 10/406,870

(22) Filed: Apr. 4, 2003

(65) Prior Publication Data
US 2004/0199809 A1    Oct. 7, 2004

(51) Int. Cl.
*H03M 13/00* (2006.01)
*G01R 31/28* (2006.01)
*H04L 1/18* (2006.01)
*G06F 7/02* (2006.01)
*G06F 11/00* (2006.01)
*G06F 15/16* (2006.01)

(52) U.S. Cl. .................. 714/751; 714/712; 714/819; 714/43; 709/203

(58) Field of Classification Search .............. None
See application file for complete search history.

(56) References Cited

U.S. PATENT DOCUMENTS

| 4,589,111 | A  | * | 5/1986  | Adachi ................... 714/748 |
| 5,696,904 | A  | * | 12/1997 | Hashimoto et al. .......... 709/224 |
| 5,925,140 | A  | * | 7/1999  | Hudson ..................... 714/52 |
| 6,289,012 | B1 |   | 9/2001  | Harrington et al. |
| 6,301,681 | B1 | * | 10/2001 | Chen et al. ................ 714/751 |
| 6,377,974 | B1 |   | 4/2002  | Feigenbaum |
| 6,401,239 | B1 |   | 6/2002  | Miron |

\* cited by examiner

*Primary Examiner*—Christine T Tu
(74) *Attorney, Agent, or Firm*—Robert C Kowert; Meyertons, Hood, Kivlin, Kowert & Goetzel, P.C.

(57) ABSTRACT

A client-server system for downloading a data file from a server to a client with real time verification. The system including a server. The server including a data file, and a verification file. The verification file containing first error detection data associated with the data file. The system also including a client which communicates with the server through a network. The client including a download manager for downloading the data file from the server to the client. When the download manager downloads at least a portion of the data file, the download manager generates second error detection data associated with the data file and compares the first and second error detection data to determine if errors occurred in the data file.

24 Claims, 6 Drawing Sheets

SYSTEM AND METHOD FOR DOWNLOADING FILES OVER A NETWORK WITH REAL TIME VERIFICATION

FIELD OF THE INVENTION

The present invention relates generally to transferring of electronic files from one location to another over a network. More specifically, the present invention relates to a client-server system having a download manager application on the client, which provides real-time file verification, i.e., error detection, of downloaded files by comparing error detection data to a verification file generated by a verification application on the server.

BACKGROUND OF THE INVENTION

A feature of the Internet is the ability to transmit electronic data files from one computer to another using various types of file transfer protocols such as File Transfer Protocol (FTP) and Hypertext Transfer Protocol (HTTP). Data in this sense may include any form of information including, but not limited to, numbers, text and/or programming code. Accordingly, there are many different types of data files which may be transmitted on the Internet, e.g., image files, index files, computer operating system files, and data dictionaries. Currently, data files available to be downloaded from host computers are increasingly large in size resulting in increased overall download times. As a result, downloading large data files over the Internet, especially files over 300 MB in size, can be a time consuming process that often leads to problems occurring during the download process.

For example, a downloading process is occasionally interrupted due to a network connection failing or a power failure. Additionally, a file may be corrupted during a downloading process due to a hardware or software malfunction, rendering the downloaded file unreadable or otherwise unusable. Larger files require a longer time to download than smaller files, thus, there is a greater chance of the occurrence of some type of failure during the downloading of a larger file than that of a smaller file. Usually, a file being downloaded at the time of an interruption or equipment failure must be downloaded again in its entirety, even if most of the file had already been transferred at the time of the interruption or failure. Thus, successful downloading of a large file over the Internet often requires multiple attempts to complete the file transfer. Regardless of the type of failure, repetitive time-consuming downloads of the same file can be frustrating for a client-user as well as costly in terms of the server bandwidth utilized.

SUMMARY OF THE INVENTION

The present invention offers advantages and alternatives over the prior art by providing a client-server system for downloading a data file from a server to a client, which utilizes a verification file associated with the data file to provide error detection of the data file during downloading. The system provides real-time verification of the downloaded data file, i.e., it determines if the downloaded data of the data file has been corrupted in real time during the download, with little to no impact on system performance.

These and other advantages are accomplished in an exemplary embodiment of the invention by providing a client-server system which includes a server. The server including a data file, and a verification file. The verification file containing first error detection data associated with the data file. The system also including a client which communicates with the server through a network. The client including a download manager for downloading the data file from the server to the client. When the download manager downloads at least a portion of the data file, the download manager generates second error detection data associated with the data file and compares the first and second error detection data to determine if errors occurred in the data file.

In an alternative exemplary embodiment the verification file of the client-server system includes a predetermined number of segment identifiers indicative of corresponding segments, which the data file is divided into. The verification file also includes a segment size associated with each segment identifier and first error detection data calculated for each segment identifier.

In another exemplary embodiment the download manager of the client-server system includes an executable program for:
downloading the verification file;
downloading a segment of the data file identified by the verification file;
calculating second error detection data for the downloaded segment; and
comparing the first and second error detection data associated with the segment.

Moreover, in yet an alternative exemplary embodiment, the download manager of the client-server system includes an executable program for:
initiating the downloading of the data file upon receiving location data identifying a location of the data file; and
utilizing information from the location data to build new location data pointing to the location on the server containing the verification file associated with the data file.

DETAILED DESCRIPTION

Figure 1:
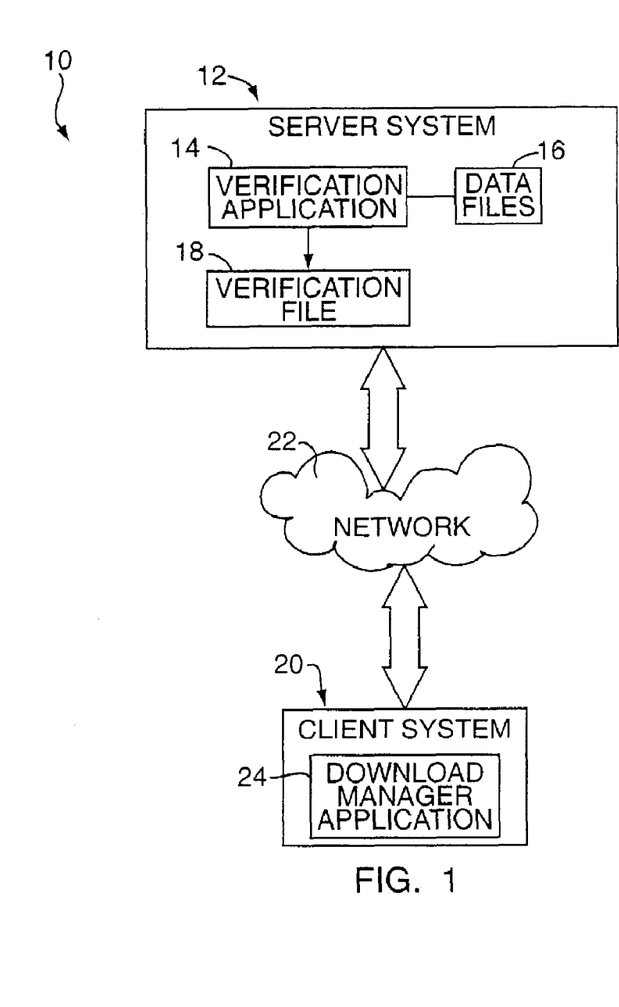
FIG. 1 is an exemplary embodiment of a schematic block diagram of a client-server system in accordance with the present invention.

Referring to FIG. 1, an exemplary embodiment of a schematic block diagram of a client-server system in accordance with the present invention is shown generally at 10. The client-server system 10 includes a server system 12 (or server) having a verification application 14 which reads a data file 16 and generates a verification file 18 containing error detection data associated with that data file 16. The client-server system 10 also includes a client system 20 (or client) which communicates with the server 12 through a network 22. The client 20 includes a download manager application 24

(or download manager) which manages transfer of the verification file 18 and the data file 16 from the server 12 to the client 20.

A download manager in general is a utility that may integrate into and replace the native download function in a web brower, e.g, as a bowser plug in. It can also be a function within a larger program that manages the file transfer from a remote device to a client. A download manager may also function as a stand-alone application into which specified locations of data files available for downloading, e.g., Uniform Resource Locators (URLs), are placed.

Download managers usually provide a user with resumable file transfer capability, i.e., the ability to continue an interrupted download at the point of failure rather than from the beginning. Additionally, download mangers may offer a number of other features including the capability of downloading several files at the same time, and the ability to pause and resume downloads. Some download managers are known as "download accelerators," wherein they are generally known to download faster than a browser's built-in function. Download managers generally provide more control over the download process.

However, prior art download mangers do not provide an adequate means of error detection and correction. That is, prior art download managers do not provide a mechanism to ensure that a downloaded file is received correctly and that no data corruption occurred between the server and the client. This is especially problematic with large files where the longer a connection is kept open during the download process, the more likely corruption of the downloaded data will occur.

The download manager 24 of the present invention advantageously generates its own error detection data, e.g., a series of checksums, based on the downloaded data file 16. The error detection data of the download manager 24 is compared to the error detection data previously stored in the verification file 18 to guarantee the integrity of the data file 16 during downloading.

Advantageously, the download manager application 24 residing on the client 20, and the verification application 14 residing on the server 12 provide real-time verification (or error detection) while the data file 16 is being downloaded from server 12 to client 20. That is, the real-time verification process has little or no significant time impact on the performance of the downloading process. The download manager and verification application in this exemplary embodiment is written in the Java programming language, although one skilled in the art would recognize that any one of several languages may be used to write the applications.

The client-server system 10 is a computing system in which the client 12, e.g., computer or application, requests services from the server 14. Clients and servers in general typically run from different computers interconnected by a computer network. Use of the Internet, such as for information retrieval from the World Wide Web, is an example of client-server computing. However the term "client-server system" is generally applied to systems in which an organization runs programs with multiple components distributed among computers in a network.

Servers in general, such as the server 12 in this exemplary embodiment, are typically a computer or computer system in a network shared by multiple users. The term may refer to both the hardware and software or just the software that performs the service. For example, web server may refer to the web server software in a computer that also runs other applications, or it may refer to a computer system dedicated to the web server application. There may be several dedicated servers of various different specialized functions in a large server system, e.g., application servers, audio servers, database servers, fax servers, file servers, proxy servers or web servers to name a few.

Clients in general, such as the client 20 in this exemplary embodiment, are typically a process, application or program that sends messages to the server via a network. Those messages request the server to perform specific tasks which the client relies upon, such as looking up and downloading a data file or a portion of a data file on the server's hard disk. Clients usually run on a personal computer or workstation and manage local resources such as display, keyboard, local disks and other peripherals.

Figure 2:
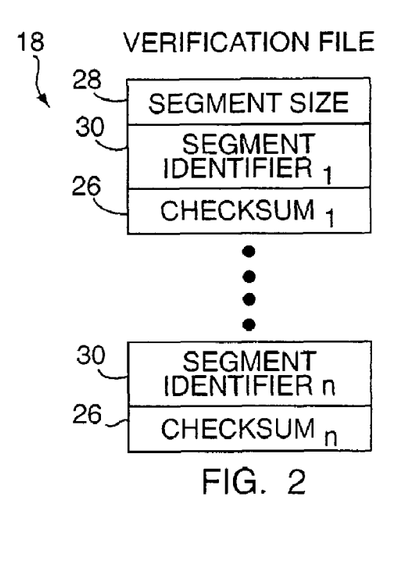
FIG. 2 is a schematic block diagram of the verification file of FIG. 1.

Referring to FIG. 2, prior to making the data file 16 available for downloading at the server 12, the verification application 14 is run against the data file 16 to generate the verification file 18. The verification application 14 reads the data file 16 as a series of segments of a specified segment size 28 and calculates a checksum value 26 for each segment read. Generally the segment size 28 is the same for each segment and is stored in the verification file 18 as a single value. The checksum 26 for each segment is also stored in the verification file 18, along with an indication of which segment the checksum values are for, i.e., a segment identifier 30. Though the segment size 28 is stored as a single value in this exemplary embodiment, one skilled in the art would recognize that the segments may vary in size and a unique segment size 28 may be required to be stored for each individual segment identifier 30.

Once the entire data file 16 has been processed, the resultant verification file 18 and the data file 16 are both made available for downloading from the server 12. The verification data files 18 for all data files 16 are typically stored in a common download location, using a specific naming convention to allow access. Generally, the default Uniform Resource Locator (URL) associated with this location is specified as a predefined property value that is read in when the download manager 24 initializes.

Figure 3:
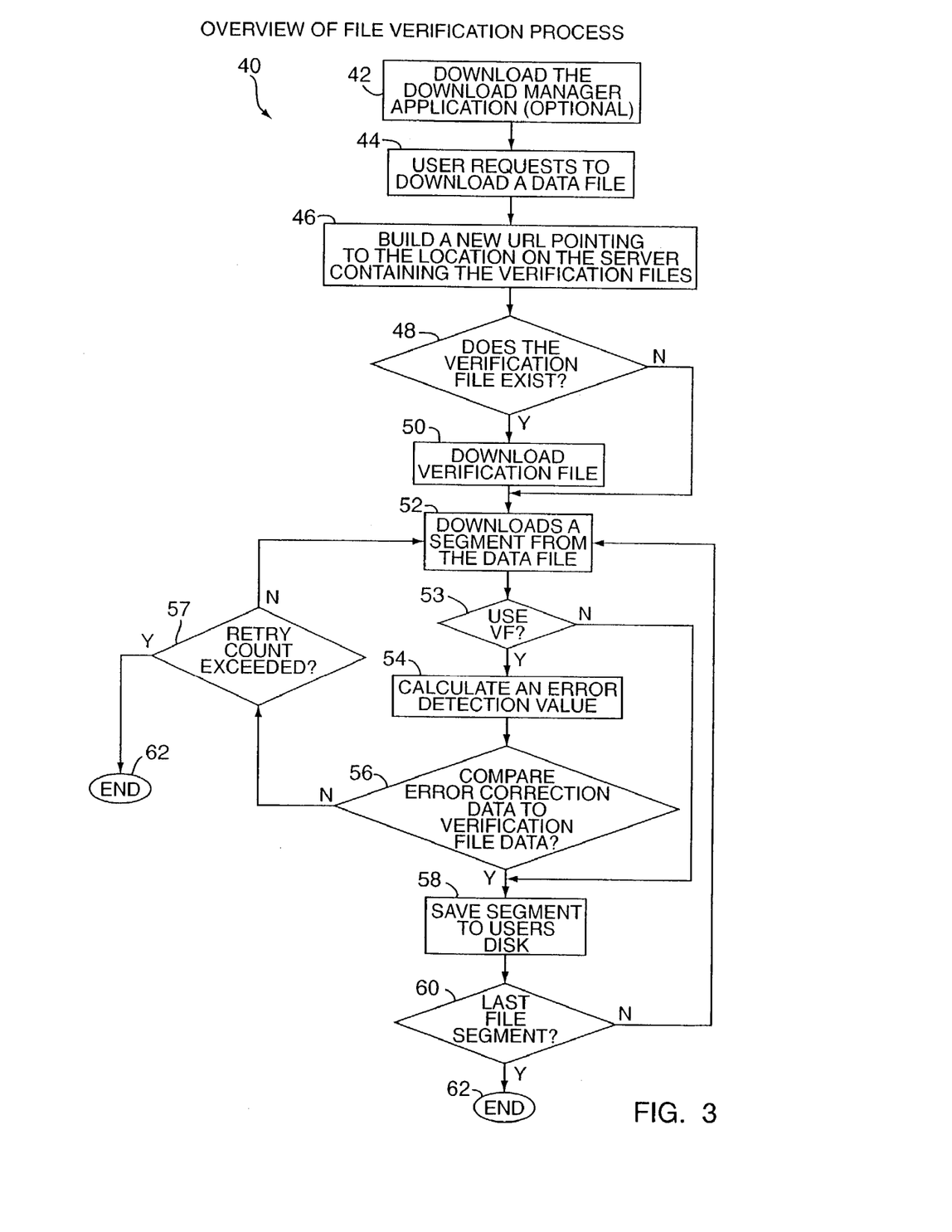
FIG. 3 is a flow chart of an exemplary overview of the file verification process in accordance with the present invention.

Referring to FIG. 3, a flow chart of an exemplary overview of the file verification process is shown generally at 40. When a user at the client 20 requests a download of a datafile 16 from the server 12, the server will prompt the user to first download the download manager application 24 onto the client, as illustrated in step 42 of the flow chart 40. This in an optional step that only needs to be done once.

Once the download manager is installed on the client, the user would then request (step 44) to download the data file 16 by providing the download manager 24 with the URL of the data file 16. This can be done in several ways, e.g., cut and paste, drag and drop, or command lines. Additionally, a download manager may be configured as a browser plug-in and set to launch automatically when downloadable file types are requested.

Proceeding to step 46, once the URL of the data file 16 is put into the download manager's work queue, the download manager 24 utilizes information from the data file's URL to build a new URL pointing to the location on the server containing the verification files 18. This is typically accomplished by the download manager 24 parsing off the last field of the data file's URL, which is usually (though not always) the name of the data file 16 that is going to be downloaded, for example "fileone". Alternatively, the file name may be provided by the server 12 in one of the header fields. The download manager then appends this field to an extension, which names the verification file if it does exist, e.g., "fileone.extension". Finally the download manager appends a path name, which points to where the verification files are stored on the server, e.g., "path.fileone.extension".

The download manager 24 then attempts to download an existing verification file with that name, e.g., "fileone.extension", from the server (step 48). If the download manager cannot retrieve the file, it means that the file does not exist and the downloading application skips to step 52 where it downloads a segment form the data file. If, however, the file does exist, the verification file 18 is downloaded into the client (step 50) and then proceeds to step 52.

From the verification file 18, the download manager 24 extracts the segment size 28 and checksum 26, for the first identified segment 30. Using standard download protocols, e.g., the get byte range functionality of http, the download manager gets the first segment (step 52).

As illustrated in decision block 53, the download manager 24 next determines if a verification file is being used. If not, the download manager application 24 proceeds to step 58 where it writes the segment to the client's disk without performing any verification analysis.

If a verification file is being used, the download manager 24 increments to block 54, where the download manager then calculates an error detection data based on the downloaded segment. In this exemplary embodiment the error detection data is a checksum 26, which is an error detection scheme in which each transmitted message is accompanied by a numerical value based on the number of set bits in the message. However, the error detection data may be generated using a variety of well-known techniques or algorithms. For example, another known error detection technique is called Cyclic Redundancy Check (CRC), which can be used in place of, or in addition to, a checksum value.

Next, in step 56, the download manager 24 compares the checksum calculated on the downloaded data to the expected checksum value 26 in the verification file 18. If the values do not match, the segment is discarded and the download manager proceeds to step 57. In decision block 57 the download manager will determine if a user settable retry count has been exceeded. That is if the retry count exceeds a predetermined number of iterations before a successful comparison is made, then an error message is generated and the download process is ended at step 62. If the retry count is not exceeded, the download manager 24 returns to step 52 to download the same segment again.

If the checksum values do match in decision block 56, then the download manager writes the segment to the user's disk (step 58). Though this exemplary embodiment illustrates the download manager writing to a user's disk, one skilled in the art would recognize that other specified locations may be used, e.g., any memory device, a display screen, a printer or a computer outside of the client system.

Next the download manager determines if the downloaded segment is the last segment (step 60). If not, the download manager returns to step 52 to download the next segment. If it is the last segment, the download manager application ends at step 62.

The download manager will continue until the entire data file 16 is downloaded and verified. When the download manager determines the last segment has been reached in step 58, the process will proceed to step 62 and end.

When the verification process ends, the download manager 24 will determine if there are any other data file URLs in its work queue. If so, it will continue to the next URL in the queue and perform the verification process 40 again until the work queue is empty.

Figure 4:
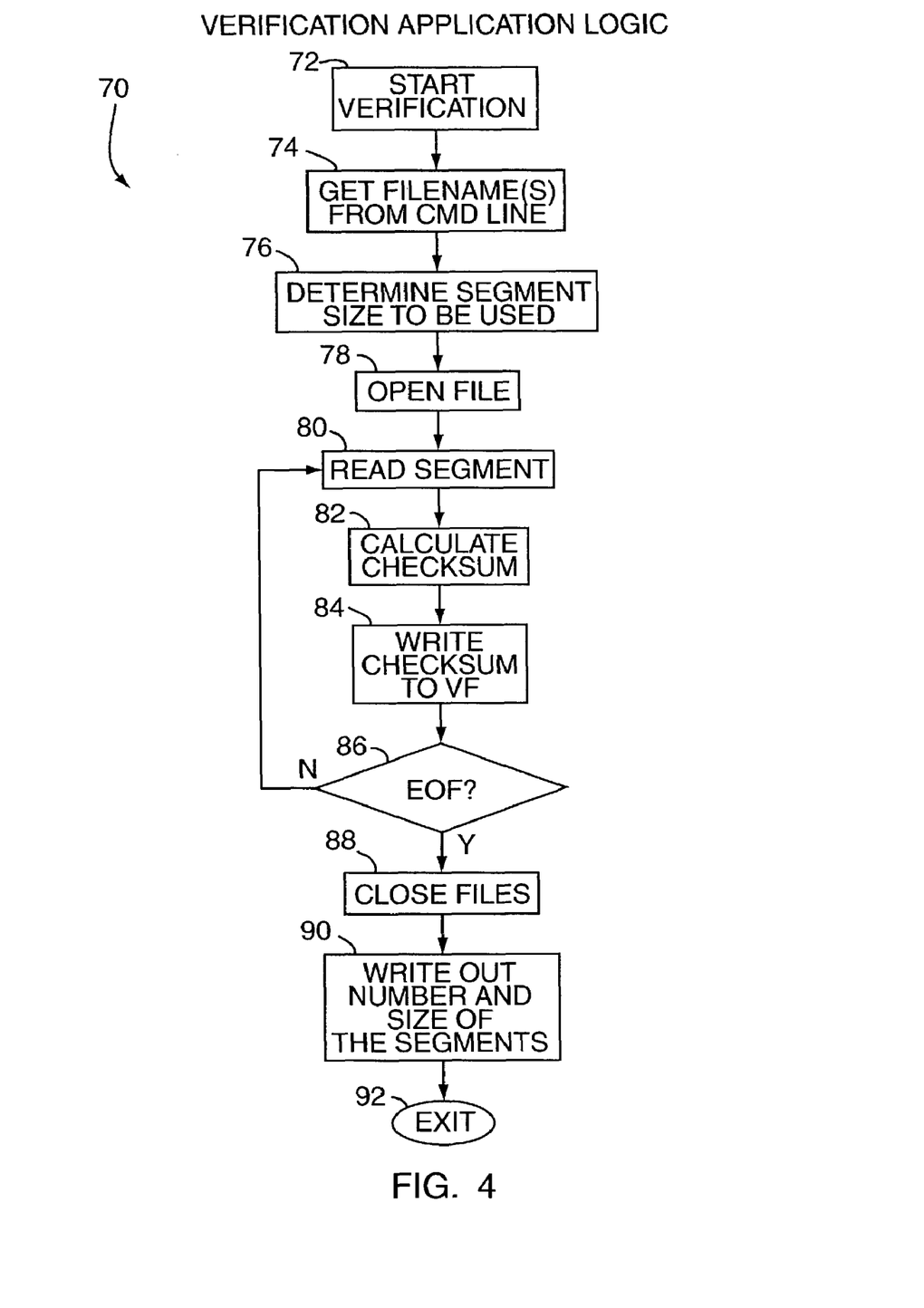
FIG. 4 is an exemplary flow chart of the programming logic for the verification application of FIG. 1.

Referring to FIG. 4, an exemplary flow chart of the programming logic for the verification application 14 is shown generally at 70. The flow chart 70 illustrates the way in which a verification file 18 is created by the verification application 14.

After the verification application 14 is started (block 72), the application prompts a user of the server system 12, e.g., a server manager, for the name (or names) of the data file 16 for which a verification file 18 is to be created (block 74). This can be done in several well known ways, including through the use of command lines or wild cards. For example, if a wild card such as "*" is used, then the verification application 14 will create verification files 18 for all the data files 16 in the same directory the verification application 14 is being run on.

Proceeding to step 76, the application 14 determines what segment size is to be used in the verification file 18. This can be done utilizing a variety of well-known techniques. Typically, the verification application software is set to a default value, e.g., 1 MB per segment. However, the default value can be overridden by the user in a number of different ways, for example, by changing the default value on the command line.

The verification application 14 then opens the data file 16 (step 78) and reads in a segment (step 80). The application 14 calculates a checksum (step 82) for that segment and writes it to the verification file 18 (step 84).

The application 14 then proceeds to block 86 where it checks for an end of file (EOF) marker in the data file 16. If there is no EOF marker, then the application 14 loops back to step 80 to read another segment from the data file 16 and repeat the process. If an EOF is reached, the data file 16 is closed (step 88) and the verification application 14 writes the number and size of the segments to the verification file (step 90) and exits the program (step 92). The reason for writing the size of the segments to the verification file 18 in step 90, is so that the download manager 24 can determine the size of the segments to be used in downloading the data file 16 associated with that particular verification file 18.

FIGS. 5 through 9 are programming logic flow charts for functions and features of the download manager application 24. They include the initialization procedure, various Graphical User Interface (GUI) functions, and the download procedure of the download manager 24.

Figure 5:
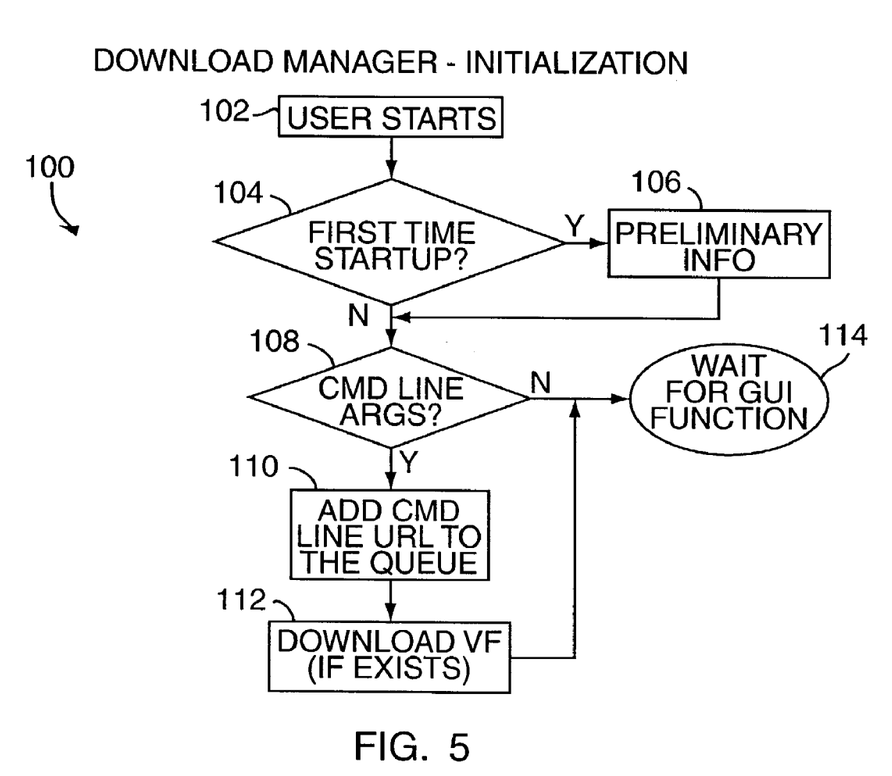
FIG. 5 is a detailed flow chart of the initialization procedure of the download manager application of FIG. 1.

Referring to FIG. 5, a detailed flow chart of the initialization procedure of the download manager 24 is shown generally at 100. After the download manager 24 is started (block 102), the application determines if this is a first time start up (block 104), e.g., if the download manager application 24 has ever been initialized at this particular client 20 before. If it is a first time startup, the user operating the client 20 is prompted for some preliminary information at step 106. Such information may include: whether or not the client is using a proxy server, where the user wishes to store the downloaded data file (s) 16 on the client 20, and/or the number of tries the user wishes to retry downloading a segment before posting an error message. The user also has the option of just using the default values for each question he or she is prompted for.

Proceeding to step 108, the download manager checks to see if any command line arguments are entered. Normally the download manager application is run as a GUI application. However, block 108 provides a functionality that allows the download manager 24 to operate directly from the command line, rather than having to interact with the GUI. This functionality provides added speed and flexibility to large scale users, e.g., system administrators for large systems running Unix.

If it is determined that command lines have been used (step 108), then the application proceeds to the other steps of adding the command line URL to the queue (step 110) and downloading the verification file 18 if it exists (step 112).

If no command line arguments are used, the application advances to block 114 where it goes into a wait state. The application is made to exit this wait state upon the execution of a GUI function.

Figure 6:
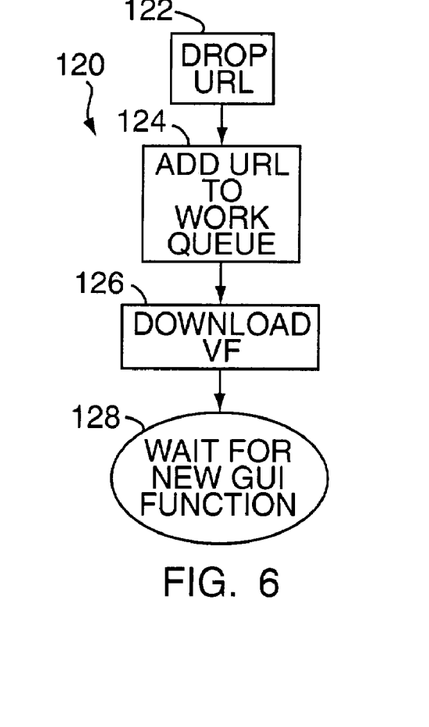
FIG. 6 is a flow chart of the "Drop URL" GUI function of the download manager of FIG. 1.
Figures 7, 8:
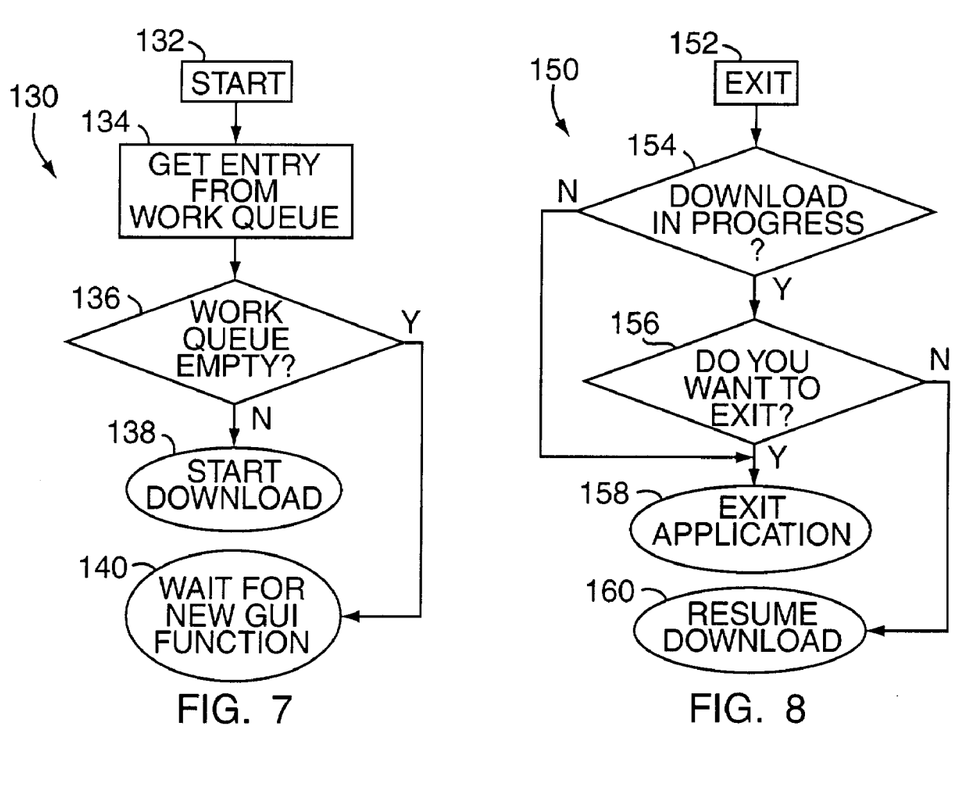
FIG. 7 is a flow chart of the "Start" GUI function of the download manager of FIG. 1.
FIG. 8 is a flow chart of the "Exit" GUI function of the download manager of FIG. 1.

FIGS. 6, 7, and 8 illustrate some GUI functions associated with the download manager application 24. Other GUI functions may also be utilized, however the ones described below provide the basic operational controls of: adding a URL of a data file 16 to the download manager's work queue (FIG. 6); starting the download manager application (FIG. 7); and exiting the application (FIG. 8).

Referring to FIG. 6, a flow chart of the "Drop URL" feature of the download manager 24 is shown generally at 120. In step 122, the user can drag and drop a URL of a data file 16 residing on the server 12 to the download manager 24 icon on a computer screen of the client 20. The download manager application 24 then adds the URL to the work queue in block 124 and downloads the verification file 18 in block 126. The download manager application 24 will then wait for a new GUI function command in step 128. This is basically the same logic that was illustrated in steps 108-114 of FIG. 5 when dealing with the alternative command line.

Referring to FIG. 7, a flow chart of the "Start" feature of the download manager 24 is shown generally at 130. The user clicks on the "start download" button in step 132. The download manager 24 then attempts to get a URL from the work queue in block 134. In step 136, the application determines if the work queue is empty. If the work queue is empty the program proceeds to step 140 where it enters another wait state. If the work queue contains a URL, then the download procedure is initiated in step 138.

Referring to FIG. 8, a flow chart of the "Exit" feature of the download manager 24 is shown generally at 130. The user can exit the download manager application 24 at any time by clicking on the "exit" button in block 152. The program 24 then determines if a download is in progress (step 154). If no download is in progress the application proceeds to step 158 where it exits. If a download is in progress, the application informs the user and asks if he/she still wishes to exit in block 156. If the user responds affirmatively the program again exits at 158. However, if the answer is no, then the program finishes the download process in step 160.

Figure 9:
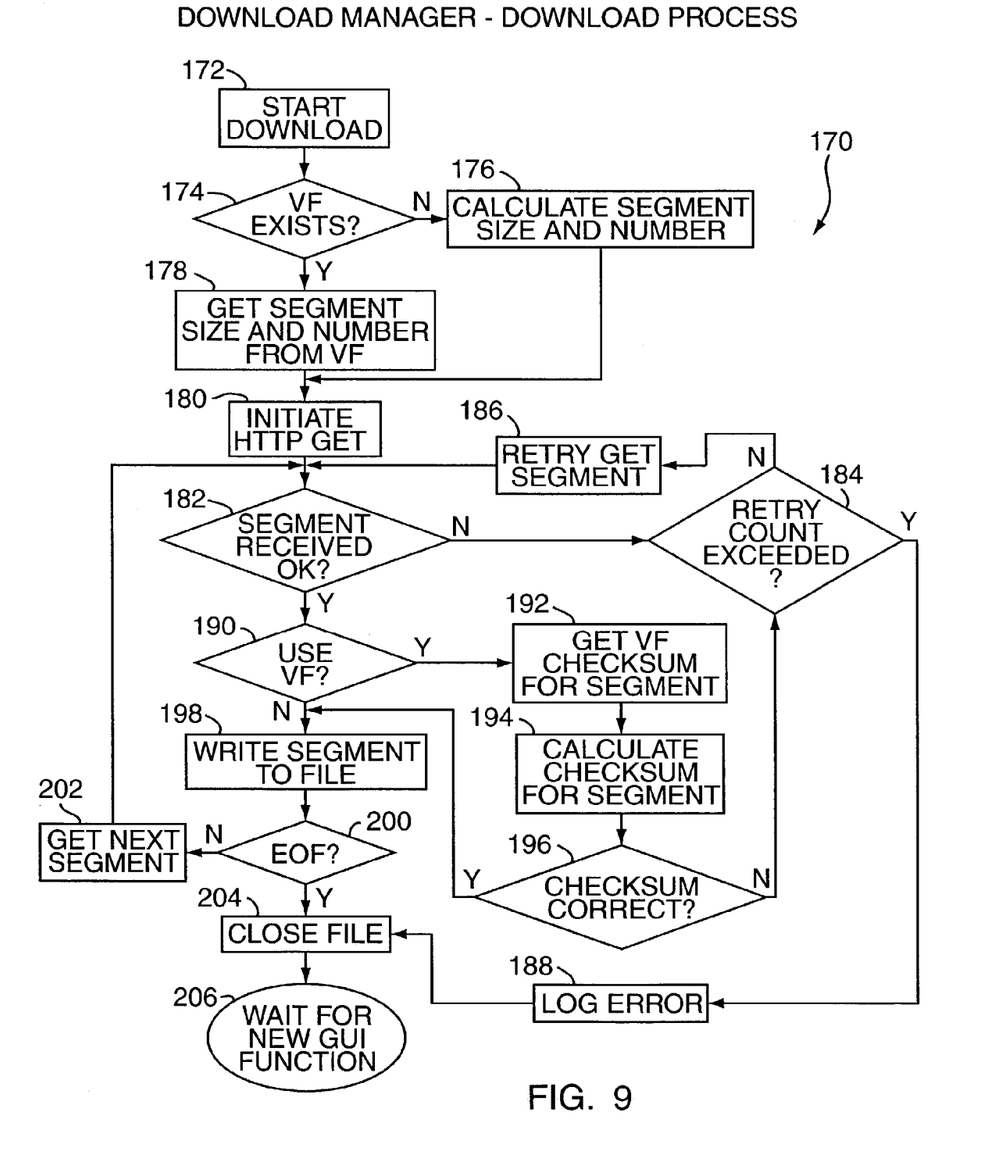
FIG. 9 is a flow chart of the detailed download procedure of the download manager of FIG. 1.

Referring to FIG. 9, a flow chart of the detailed download procedure of the download manager 24 is shown generally at 170. Once the download procedure is started (block 172) the application progresses to block 174 where it determines if a verification file 18 exists on the local client 20 for the data file 16 to be downloaded. That is, the download manager application 24 confirms in step 174 whether or not the verification file 18 was previously downloaded to the client 20 by, for example, the Drop URL GUI function (FIG. 6) or by command lines (FIG. 5).

If the verification file 18 does exist on the client, the download manager 24 calculates the segment size to be used during downloading (step 176), usually by the default settings or from information obtained at initialization (step 106 of FIG. 5). If in step 174 it is determined that the verification file does exists, then the application 24 proceeds to step 178 where it reads the segment size and the number of segments for the data file 16 from the downloaded verification file 18.

Advancing to step 180, the program 24 requests that a segment of the data file 16 be downloaded. This is typically done utilizing the get byte functionality of http.

In block 182, the program then determines if the segment was successfully received. That is, the application 24 determines if a segment was actually downloaded from the server 12 to the client 20. If the segment is not on the client, the application initiates a retry function by first proceeding to block 184 to determine if the retry count has been exceeded and then to step 186 to retry reading the same segment. The program will loop through steps 184 and 186 until the retry count has been exceeded. If the count is exceeded the download manager logs an error (step 188), closes the file (step 204) and waits for a new command or GUI (step 206), i.e., goes into a wait state.

However if, in block 182, it is determined that a segment has been successfully received, then the application 24 moves to block 190 where it determines if a verification file 18 is being used. If not, the application 24 writes the segment to the client's disk (step 198) without performing any verification analysis.

If however, a verification file 18 is being used, then the program 24 reads the checksum value 26 associated with the downloaded segment from the verification file (step 192). Next, the download manager application 24 calculates the checksum for the segment it just downloaded (step 194) and compares the calculated checksum of the downloaded segment to the checksum 26 obtained from the verification file (step 196). If the checksums match in block 196, the application 24 again proceeds to block 198 where it writes the segment to the client's disk. If the checksums do not match, the application proceeds back to block 184 where it again initiates the retry function.

After writing the segment to the client's disk, the program steps to block 200 where it checks for an End Of File (EOF) indicator. If no EOF indicator is detected, the application proceeds to step 202 to get the next segment. The application continues through this loop until the last file is written to the client's disk and the EOF is detected in step 200. Once an EOF is detected, the application 24 closes the file (step 204) and goes into its wait state (206).

While exemplary embodiments have been shown and described, various modifications and substitutions may be made thereto without departing from the spirit and scope of the invention. Accordingly, it is to be understood that the present invention has been described by way of illustration and not limitation.

What is claimed is:

1. A client-server system, comprising:
   a server computer including,
      a data file, and
      a separate verification file containing first error detection data associated with the data file, wherein the separate verification file includes data comprising a predetermined plurality of segment identifiers indicative of corresponding segments into which the data file is divided; and
   a client computer which communicates with the server computer through a network, the client computer including a download manager for downloading the data file from the server computer to the client computer;
   wherein when the download manager downloads at least a portion of the data file, the download manager generates second error detection data associated with the data file and compares the first and second error detection data to determine if errors occurred in the data file; and
   wherein the server computer is configured to generate the separate verification file prior to the download manager beginning to download the data file.

2. The client-server system of claim 1, wherein the verification file includes data comprising:
   a segment size associated with each of the plurality of segment identifiers; and first error detection data calculated for each of the plurality of segment identifiers.

3. The client-server system of claim 2 wherein the download manager comprises an executable program for:
   downloading the verification file;
   downloading a segment of the data file identified by the verification file;
   calculating second error detection data for the downloaded segment; and
   comparing the first and second error detection data associated with the segment.

4. The client-server system of claim 3, wherein the download manager further comprises an executable program for:
   discarding the downloaded segment if the first and second error detection data do not match;
   iterating the downloading of the segment, calculating of the second error detection data, and matching of the first and second error detection data until either the first and second error detection data match or a predetermine number of iterations has been exceeded;
   writing the segment to a specified location if the first and second error detection data match; and
   generating an error message if the predetermined number of iterations has been exceeded.

5. The client-server system of claim 3 wherein the first and second error detection data includes a checksum.

6. The client-server system of claim 2, wherein the server computer includes a verification application comprising an executable program for:
   reading the name of the data file, for which the verification file is to be generated;
   determining the segment size to be used in the verification file;
   reading in a segment of the data file;
   calculating the first error detection data for that segment; and
   writing the first error detection data to the verification file.

7. The client-server system of claim 6 wherein the verification application further comprises an executable program for:
   checking for an End Of File (EOF) marker in the data file;
   reading another segment if there is no EOF marker; and
   writing the number and size of the segments to the verification file if the EOF marker is reached.

8. The client-server system of claim 1 wherein the download manager comprises an executable program for:
   initiating the downloading of the data file upon receiving location data identifying a location of the data file; and
   utilizing information from the location data to build new location data pointing to the location on the server computer containing the verification file associated with the data file.

9. The client-server system of claim 8 wherein the location data is the data file's URL and the new location data is a new URL pointing to the location of the verification file.

10. A system, comprising:
    a client computer configured to interconnect to a server by a network, wherein the client computer is configured to implement:
        a download manager for downloading a data file from the server to the client computer, the data file having a separate associated verification file containing first error detection data associated with each of a respective plurality of segments of the data file, the download manager comprising a program executable by the client computer to implement:
           initiating the downloading of the data file upon receiving location data identifying a location of the data file;
           utilizing information from the location data to build new location data pointing to the location on the sewer containing the verification file associated with the data file;
           downloading at least a portion of the data file;
           generating second error detection data associated with the downloaded portion of the data file; and
           comparing a corresponding portion of the first error detection data and second error detection data to determine if errors occurred in the data file.

11. The system of claim 10, wherein the verification file includes a predetermined plurality of segment identifiers indicative of corresponding segments, which the data file is divided into, a segment size associated with each segment identifier and first error detection data calculated for each segment identifier, the download manager further comprising a program executable by the client computer to implement:
    downloading the verification file; and
    for each of the plurality of segment identifiers:
        downloading a segment of the data file identified by the verification file;
        calculating second error detection data for the downloaded segment; and
        comparing the first and second error detection data associated with the segment.

12. The system of claim 11, wherein the download manager further comprises a program executable by the client computer to implement:
    discarding a corresponding downloaded segment if the first and second error detection data do not match;
    iterating the downloading of the segment, calculating of the second error detection data, and matching of the first and second error detection data until either the first and second error detection data match or a predetermined number of iterations has been exceeded;
    writing the segment to a specified location if the first and second error detection data match; and
    generating an error message if the predetermined number of iterations has been exceeded.

13. The system of claim 12 wherein the first and second error detection data includes a checksum.

14. The system of claim 10, wherein the location data is the data file's URL and the new location data is a new URL pointing to the location of the verification file.

15. A system, comprising:
    a server computer configured to interconnect to a client computer by a network, wherein the server computer is configured to implement:
        a verification application for generating error detection data of a data file to be downloaded from the server computer to the client computer, the verification application comprising a program executable by the server computer to implement:
           reading the name of the data file, for which a verification file is to be generated; and
           for each of a plurality of segments into which the data file is to be divided:
               determining a segment size to be used in the verification file for the segment;
               reading in the segment of the data file;
               providing a segment identifier indicative of the segment;
               calculating error detection data for the segment; and writing the error detection data, the segment size and the segment identifier to the verification file.

16. The system of claim 15, wherein the verification application further comprises an executable program for:
checking for an End Of File (EOF) marker in the data file;
reading another segment if there is no EOF marker; and
writing the number and size of the segments to the verification file if the EOF marker is reached.

17. A computer-implemented method for downloading a data file from a server computer to a client computer, the method comprising:
providing a data file available for downloading;
generating a separate verification file containing first error detection data associated with the data file prior to beginning downloading of the data file, wherein the separate verification file includes data comprising a predetermined plurality of segment identifiers indicative of corresponding segments into which the data file is divided;
at a client computer:
downloading at least a portion of the data file;
generating a second error detection data associated with the data file; and
comparing the first and second error detection data to determine if errors occurred in the data file.

18. The computer-implemented method of claim 17, comprising:
at the server computer:
reading the name of the data file, for which the verification file is to be generated; and
for each of a plurality of segments into which the data file is to be divided:
determining a segment size to be used in the verification file for the segment;
reading in the segment of the data file;
providing a segment identifier indicative of the segment;
calculating the first error detection data for the segment; and
writing the first error detection data, the segment size and the segment identifier to the verification file.

19. The computer-implemented method of claim 18 comprising:
at the server computer:
checking for an End Of File (EOF) marker in the data file;
reading another segment if there is no EOF marker; and
writing the number and size of the segments to the verification file if the EOF marker is reached.

20. The computer-implemented method of claim 18, comprising:
at the client computer:
downloading the verification file;
downloading a segment of the data file identified by the verification file;
calculating the second error detection data for the downloaded segment;
comparing the first and second error detection data associated with the segment.

21. The computer-implemented method of claim 20, comprising:
at the client computer:
discarding the downloaded segment if the first and second error detection data do not match;
iterating the downloading of the segment, calculating of the second error detection data, and matching of the first and second error detection data until either the first and second error detection data match or a predetermined number of iterations has been exceeded;
writing the segment to a specified location if the first and second error detection data match; and
generating an error message if the predetermined number of iterations has been exceeded.

22. The computer-implemented method of claim 21 wherein the first and second error detection data includes a checksum.

23. The computer-implemented method of claim 17 comprising:
at the client computer:
initiating the downloading of the data file upon receiving location data identifying a location of the data file; and
utilizing information from the location data to build new location data pointing to the location on the server containing the verification file associated with the data file.

24. The computer-implemented method of claim 23 wherein the location data is the data file's URL and the new location data is a new URL pointing to the location of the verification file.

* * * * *